United States Patent
Su et al.

(10) Patent No.: US 7,658,097 B2
(45) Date of Patent: Feb. 9, 2010

(54) METHOD AND APPARATUS OF HIGH SPEED PROPERTY MAPPING

(75) Inventors: Chanmin Su, Ventura, CA (US); Peter M. Lombrozo, Santa Barbara, CA (US)

(73) Assignee: Veeco Instruments Inc., Plainview, NY (US)

( * ) Notice: Subject to any disclaimer, the term of this patent is extended or adjusted under 35 U.S.C. 154(b) by 0 days.

(21) Appl. No.: 11/537,535

(22) Filed: Sep. 29, 2006

(65) Prior Publication Data

US 2007/0089498 A1    Apr. 26, 2007

(51) Int. Cl.
    *G01B 5/28*     (2006.01)
    *G01N 13/16*     (2006.01)
(52) U.S. Cl. ....................................... 73/105
(58) Field of Classification Search .................. 73/105
    See application file for complete search history.

(56) References Cited

U.S. PATENT DOCUMENTS

| | | | |
|---|---|---|---|
| 5,224,376 A | | 7/1993 | Elings et al. |
| 6,189,374 B1 * | | 2/2001 | Adderton et al. ............... 73/105 |
| 6,880,386 B1 | | 4/2005 | Krotil et al. |
| 2002/0092982 A1 * | | 7/2002 | Jhe et al. ..................... 250/306 |
| 2004/0084618 A1 * | | 5/2004 | Spizig et al. ................. 250/306 |

OTHER PUBLICATIONS

Rosa-Zeiser et al. "The simultaneous measurement of elastic, electrostatic, and adhesive properties by scanning force microscopy: pulsed-force operation." Meas. Sci. Technol. vol. 8, 1997, 1333-1338.*

Onaran et al., A new atomic force microscope probe with force sensing integrated readout and active tip, Review of Scientific Instruments, Feb. 9, 2006, pp. 023501-1-023501-7, vol. 77, issue 2, American Institute of Physics.

Rost et al., Scanning probe microscopes go video rate and beyond, Review of Scientific Instruments, Apr. 26, 2005, pp. 053710-1-053710-9, vol. 76, issue 5, American Institute of Physics.

Viani et al., Fast imaging and fast force spectroscopy of single biopolymers with a new atomic force microscope designed for small cantilevers, Review of Scientific Instruments, Jul. 29, 1999, pp. 4300-4303, vol. 70, issue 11, American institute of Physics.

Miyatani et al., Mapping of electrical double-layer force between tip and sample surfaces in water with pulsed-force-mode atomic force microscopy, Appl. Phys. Lett., Nov. 3, 1997, pp. 2632-2634, vol. 71, issue 18, American Institute of Physics.

(Continued)

*Primary Examiner*—Daniel S Larkin
(74) *Attorney, Agent, or Firm*—Boyle Fredrickson, SC (57) ABSTRACT

A probe instrument having a probe that interacts with a sample surface to perform a mechanical property measurement at high speed includes a scanner producing relative motion between the sample and the probe. In addition, a probe actuator produces relative motion between the sample and the probe, in a generally vertical direction, and a controller that generates a scanner drive signal and an actuator drive signal. The probe actuator is responsive to the actuator drive signal and has an operable bandwidth of at least about 50-80 kHz to perform the fast force curve measurements. The probe actuator is preferably located at least partially on the cantilever. Moreover, feedback during normal operation may be interrupted to perform a force curve measurement with the integrated actuator.

36 Claims, 8 Drawing Sheets

OTHER PUBLICATIONS

Gigler et al., Digital pulsed force mode and its application in non-destructive nano-mechanical testing—a new tool for material science, Aug. 30, 2005.

Csete et al., The existence of sub-micrometer micromechanical modulation generated by polarized UV laser illumination on polymer surfaces, Materials Science and Engineering, Sep. 9, 2003, pp. 939-944, vol. C, issue 23, Elsevier B.V.

Jiao et al., Accurate height and volume measurements on soft sample with the atomic force microscope, Langmuir, Oct. 8, 2004, pp. 10038-10045, vol. 20, issue 23, American Chemical Society.

* cited by examiner

METHOD AND APPARATUS OF HIGH SPEED PROPERTY MAPPING

BACKGROUND OF THE INVENTION

1. Field of the Invention

The present invention is directed to instruments employing a probe, and more particularly, a method and apparatus of mechanical property mapping using a probe microscope having at least two actuator elements to, for example, perform high speed force curve measurements.

2. Description of Related Art

Developments in nanotechnology have enabled mechanical experiments on a broad range of samples including single molecules, such that fundamental molecular interactions can be studied directly. The mechanical properties of biological molecules, in particular, such as actin filaments and DNA has lead to the development of a range of instrumentation for conducting these studies. In this regard, systems and methods differing in force and dynamic ranges currently being used include magnetic beads, optical tweezers, glass microneedles, biomembrane force probes (BFP), scanning probe microscopy (SPM), including atomic force microscopy (AFM).

With a force sensitivity on the order of a few pico-Newtons ($pN=10^{-12}$ N), an AFM is an excellent tool for probing fundamental force interactions between surfaces. AFM has been used to probe the nature of attractive van der Waals and attractive/repulsive electrostatic forces between systems such as metal probes and insulating mica surfaces, and insulating probes on insulating and conducting samples with materials such as silicon nitride, diamond, alumina, mica, glass and graphite. Other applications include the study of adhesion, friction, and wear, including the formation or suppression of capillary condensation on hydrophilic silicon, amorphous carbon and lubricated $SiO_2$ surfaces.

More particularly, for biological molecules, force is often an important functional and structural parameter. Biological processes such as DNA replication, protein synthesis, drug interaction, to name a few, are largely governed by intermolecular forces. However, these forces are extremely small. With its sensitivity in the pico-Newton scale, the SPM is particularly adapted to analyze these interactions. In this regard, SPMs have been used to generate what are known as force curves that provide particularly useful information for analyzing very small samples.

The knowledge regarding the relation between structure, function and force is evolving and therefore single molecule force spectroscopy, particularly using SPM, has become a versatile analytical tool for structural and functional investigation of single bio-molecules in their native environments. For example, force spectroscopy by SPM has been used to measure mechanical properties of samples such as the binding forces of different receptor-ligand systems, observe reversible unfolding of protein domains, and investigate polysaccharide elasticity at the level of inter-atomic bond flips. Moreover, molecular motors and their function, DNA mechanics and the operation of DNA-binding agents such as proteins in drugs have also been observed. Further, the SPM is capable of making nano-mechanical measurements (such as elasticity) on biological specimens, thus providing data relative to subjects such as cellular and protein dynamics.

Another main application of making AFM force measurements is in materials science where the study of mechanical properties of nano-scale thin films and clusters is of interest. For example, as microstructures such as integrated circuits continue to shrink, exploring the mechanical behavior of thin films from known properties of the materials becomes increasingly inaccurate. Therefore, continuing demand for faster computers and larger capacity memory and storage devices places increasing importance on understanding nano-scale mechanics of metals and other commonly used materials. In a typical case, an AFM probe interacts with the sample by indenting into the sample, causing plastic and elastic deformation. The measurement of the force required for the indentation and the resultant indentation depth gives an indication of the elastic modulus and hardness, given appropriate knowledge of the tip shape. If the measurement depends on the indentation rate, the time dependent portion thus provides information regarding the viscoelasticity and viscous flow of the samples under test.

Probe microscopes (PMs), including instruments such as the atomic force microscope (AFM), are devices that typically use a sharp tip and low forces to characterize the surface of a sample down to atomic dimensions. Generally, AFMs include a probe having a tip that is introduced to a surface of a sample to detect changes in the characteristics of the sample. In this case, relative scanning movement between the tip and the sample is provided so that surface characteristic data can be acquired over a particular region of the sample, and a corresponding map of the sample surface can be generated. However, PMs also include devices such as molecular force probes (MFPs) that similarly use a probe to characterize sample properties but do not scan.

In one application of AFM, either the sample or the probe is translated up and down relatively perpendicularly to the surface of the sample in response to a signal related to the motion of the cantilever of the probe as it is scanned across the surface to maintain a particular imaging parameter (for example, to maintain a setpoint oscillation amplitude). In this way, the feedback data associated with this vertical motion can be stored and then used to construct an image of the sample surface corresponding to the sample characteristic being measured, e.g., surface topography. Other types of images are generated directly from the detection of the cantilever motion or a modified version of that signal (i.e., deflection, amplitude, phase, friction, etc.), and are thus not strictly topographical images.

In addition to surface characteristic imaging such as topographical imaging, the AFM can probe nano-mechanical and other fundamental properties of samples and their surfaces. Again, AFM applications extend into applications ranging from measuring colloidal forces to monitoring enzymatic activity in individual proteins to analyzing DNA mechanics.

When measuring biological samples, it is useful to measure, for example, the stiffness of the sample; in one example, to separate salt crystals from DNA or to separate the DNA from a hard surface. In U.S. Pat. No. 5,224,376, assigned to the assignee of the present invention, an atomic force microscope is described in which the system can map both the local the stiffness (force spectroscopy) and the topography of a sample. In the preferred implementation, a stiffness map of the sample is obtained by modulating the force between the tip and sample during a scan by modulating the vertical position of the sample while keeping the average force between the tip and the sample constant. The bending of the cantilever, which is a measure of the force on the tip, is measured by an optical detector that senses the deflection of a light beam reflected from the back of the cantilever. In a simple example, the AFM and force spectroscopy apparatus of this patent has been used to study DNA laying on a glass surface or inorganic and organic composite materials with homogeneous and heterogeneous strictures. Modulating the force and then imaging the local stiffness of the sample has the advantage that stiffness images provide local mechanical property mapping beyond conventional topographic mapping. Notably, a key element of the probe microscope is its microscopic sensor, i.e., the probe. The probe includes a microcantilever, the design and fabrication of which is well-known in the field, which is typically formed out of silicon, silicon nitride, or glass, and has typical dimensions in the range of 10-1000 microns in length and 0.1-10 microns in thickness. The probe may also include a "tip," which, particularly in AFM, is typically a sharp projection near the free end of the cantilever extending toward the sample. In the more general field of probe microscopy, the tip may be absent or of some other shape and size in order to control the particular type, magnitude, or geometry of the tip-sample interaction or to provide greater access to chemically modify the tip surface.

The second key element of a probe microscope is a scanning mechanism ("the scanner"), which produces relative motion between the probe and the sample. It is well known by those in the field that such scanners may move either the tip relative to the sample, the sample relative to the tip, or some combination of both. Moreover, probe microscopes include both scanning probe microscopes in which the scanner typically produces motion in three substantially orthogonal directions, and instruments with scanners that produce motion in fewer than three substantially orthogonal directions.

Figure 1A:
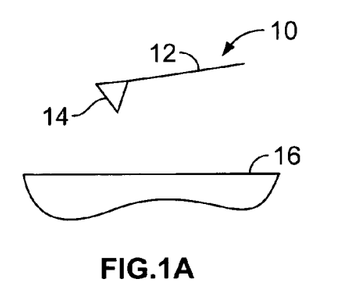
FIGS. 1A-1E illustrate a probe of an SPM as it is actuated to approach and retract from a surface so that the tip-sample forces can be mapped.
Figure 1B:
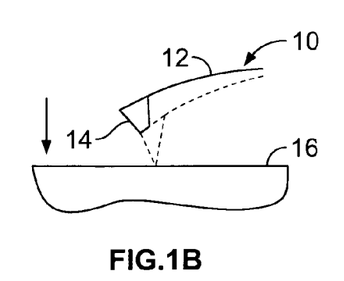
Figure 1C:
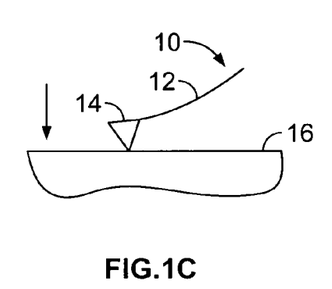
Figure 1D:
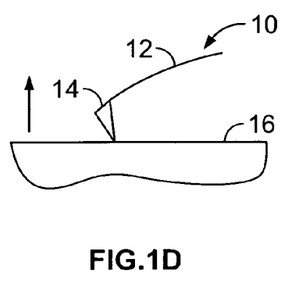
Figure 1E:
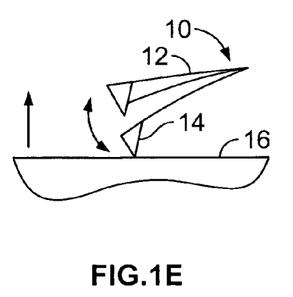
Figure 2:
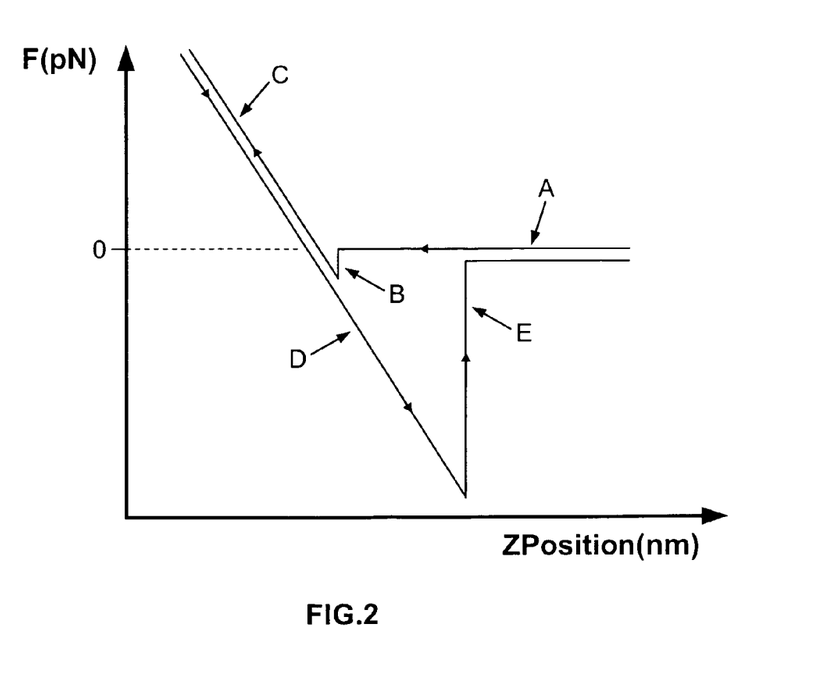
FIG. 2 is a plot illustrating force data obtained by the operation shown in FIGS. 1A-1E.

Turning to FIGS. 1A-1E and 2, force spectroscopy using SPM is illustrated. More particularly, FIGS. 1A-1E show how the forces between a tip 14 of a probe 10 and a sample 16, at a selected point (X,Y) on the sample, deflect a cantilever 12 of probe 10 as the tip-sample separation is modulated in a direction generally orthogonal to the sample surface. FIG. 2 shows the magnitude of the forces as a function of sample position, i.e., a force curve or profile.

In FIG. 1A, probe 10 and sample 16 are not touching as the separation between the two is narrowed by moving the sample generally orthogonally toward the sample surface. Zero force is measured at this point of the tip-sample approach, reflected by the flat portion "A" of the curve in FIG. 2. Next, probe 10 may experience a long range attractive (or repulsive force) and it will deflect downwardly (or upwardly) before making contact with the surface. This effect is shown in FIG. 1B. More particularly, as the tip-sample separation is narrowed, tip 14 may "jump" into contact with the sample 16 if it encounters sufficient attractive force from the sample. In that case, the corresponding bending of cantilever 12 appears on the force profile, as shown in FIG. 2 at the curve portion marked "B."

Turning next to FIG. 1C, once tip 14 is in contact with sample 16, the cantilever will return to its zero (undeflected) position and move upwardly as the sample is translated further towards probe 10. If cantilever 12 of probe 10 is sufficiently stiff, the probe tip 14 may indent into the surface of the sample. Notably, in this case, the slope or shape of the "contact portion" of the force curve can provide information about the elasticity of the sample surface. Portion "C" of the curve of FIG. 2 illustrates this contact portion.

In FIG. 1D, after loading cantilever 12 of probe 10 to a desired force value, the displacement of the sample 16 is reversed. As probe 10 is withdrawn from sample 16, tip 14 may either directly adhere to the surface 16 or a linkage may be made between tip 14 and sample 16, such as via a molecule where opposite ends are attached to the tip 14 and surface 16. This adhesion or linkage results in cantilever 14 deflecting downwards in response to the force. The force curve in FIG. 2 illustrates this downward bending of cantilever 14 at portion "D." Finally, at the portion marked "E" in FIG. 2, the adhesion or linkage is broken and probe 10 releases from sample 16, as shown in FIG. 1E. Particularly useful information is contained in this portion of the force curve measurement, which contains a measure of the force required to break the bond or stretch the linked molecule.

An example of a sample force measurement as described above is shown in FIG. 3 where two complimentary strands of DNA 20 are immobilized on the tip and sample surfaces 22 and 24, respectively. By modulating the tip-sample separation, a force curve such as that shown in FIG. 2 can be generated. As a result, a quantitative measurement of the forces and energetics required to stretch and un-bind the DNA duplexes can be mapped.

In sum, a simple force curve records the force on the tip of the probe as the tip approaches and retracts from a point on the sample surface. A more complex measurement known as a "force volume" measurement, is defined by an array of force curves obtained as described above over an entire sample area. Each force curve is measured at a unique X-Y position on the sample surface, and the curves associated with the array of X-Y points are combined into a 3-dimensional array, or volume, of force data. The force value at a point in the volume is the deflection of the probe at that position (x, y, z).

This example relates specifically to AFM force measurements that use cantilever deflection as a measure of force, but those skilled in the art will recognize that there are other physico-chemical properties that can be measured using substantially similar probes, instrumentation, and algorithms.

Although SPMs are particularly useful in making such measurements, there are inherent problems with known systems. In particular, typical SPMs use conventional fine motion piezoelectric scanners that translate the tip or sample while generating topographic images and making force measurements. A piezoelectric scanner is a device that moves by a microscopic amount when a voltage is applied across electrodes placed on the piezoelectric material of the scanner. Overall, the motion generated by such piezoelectric scanners is not entirely predictable, and hence such scanners have significant limitations.

Figures 3, 4:
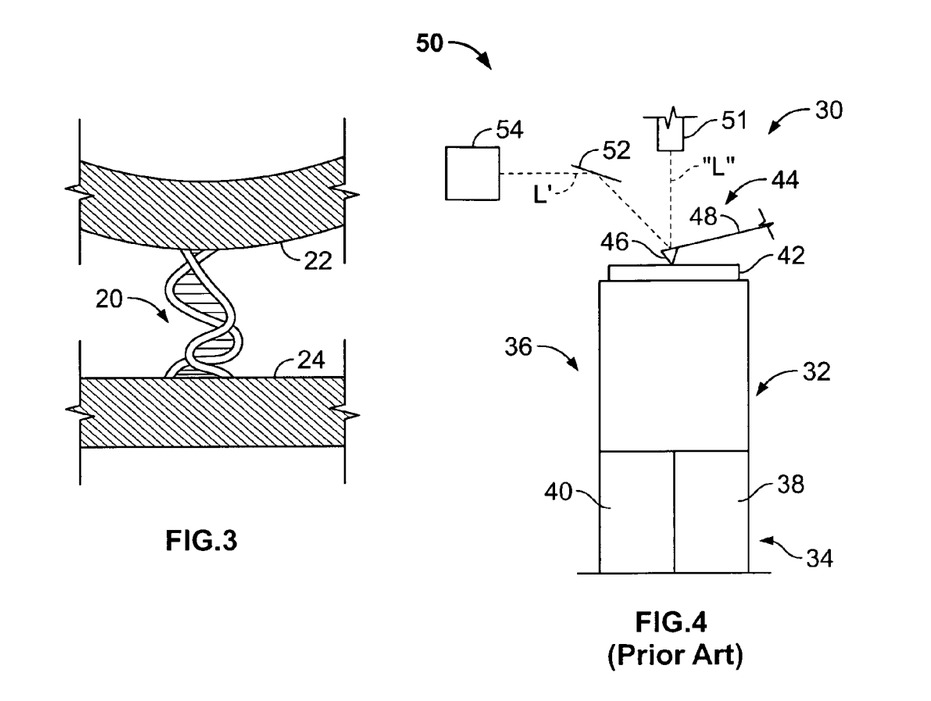
FIG. 3 is a partially broken away front elevation view of a DNA sample bonded between an AFM tip and a substrate.
FIG. 4 is an isometric view of a prior art AFM.

A conventional AFM 30 including a piezoelectric scanner 32 is shown in FIG. 4. Scanner 32 is a piezoelectric tube scanner including an X-Y section 34 and a Z section 36. In this arrangement, Z section 36 of scanner 32 is adapted to support a sample 42.

To make a force measurement, section 34 of scanner 32 translates sample 42 relative to probe 44 of AFM 30 to a selected position (x,y). As noted previously, to actuate scanner 32, sections 34, 36 include electrodes placed thereon (such as 38 and 40 for the X-Y section) that receive appropriate voltage differentials from a controller that, when applied, produce the desired motion. Next, Z section 36 is actuated to translate sample 42 toward a tip 46 of probe 44, as described in connection with the force curve measurement shown in FIGS. 1A-1E and 2. Again, as tip 46 interacts with sample 42, a cantilever 48 of probe 44 deflects. This deflection is measured with a deflection detection system 50. Detection system 50 includes a laser 51 that directs a light beam "L" towards the back of cantilever 48, which is reflective. The beam "L" reflects from cantilever 48, and the reflected beam "L" contacts a beam steering mirror 52 which directs the beam "L" towards a sensor 54. Sensor 54, in turn, generates a signal indicative of the cantilever deflection. Because cantilever deflection is related to force, the deflection signals can be converted and plotted as a force curve.

Standard piezoelectric scanners for SPMs usually can translate in three substantially orthogonal directions, and their size can be modified to allow scan ranges of typically several nanometers to several hundred microns in the X-Y plane and typically <10 microns in the Z-axis. Moreover, depending on the particular implementation of the AFM, the scanner is used to either translate the sample under the cantilever or the cantilever over the sample.

The limitations described above pertaining to typical scanners in SPMs are in many cases acceptable in applications where a probe microscope is being used in conventional imaging modes in which the XY motion is typically periodic and it is acceptable to use a relative measure of Z movement.

However, force spectroscopy experiments typically demand more precise control of relative tip-sample motion, particularly in the Z axis (the axis substantially perpendicular to the sample surface).

Typical piezoelectric scanners do not exhibit linear motion, i.e., a given change in the applied drive voltage to the piezo will result in a different magnitude of motion in different areas of the operating range. Typical piezoelectric scanners also commonly exhibit hysteretic motion, i.e., if a particular voltage ramp is applied to the scanner and then the ramp is re-traced exactly in reverse, one finds that the scanner follows a different position path on the extend versus the retract. Piezoelectric scanners also "creep," which means that they continue to extend or retract for a period of time after the applied drive voltage has stopped changing. Piezoelectric tube scanners also typically have low resonant frequencies in the Z-axis. Those skilled in the art recognize that this represents a serious limitation on the range of operating speeds for which the scanner is useful. This is because the piezoelectric material undergoes complex oscillatory motion when passing through and near the resonant frequency.

Any one or more of these limitations clearly jeopardize the integrity of the tip-sample motion, and therefore the corresponding data collected is of marginal usefulness. Overcoming these limitations is one of the key goals of this invention.

Because of the low resonant frequencies in the Z axis when an AFM utilizing a piezoelectric scanner is employed to obtain force curve measurements, the time required for the Z section 36 to actuate and translate the sample 42 and tip 46 towards one another, into contact with one another, and away from one another to obtain the force curve measurement can be anywhere between 1/10 second to 1 second. Therefore, in order to obtain the requisite number of force curve measurements for a sample when performing a force volume analysis on the sample, where approximately 10,000 force curve measurements are obtained on the sample, the overall process for the force volume measurement normally takes over one hour. On many occasions, this length of time for performing the force volume measurement presents problems in that the integrity of the sample can become severely degraded or altered over the length of time during which the force curve measurements are obtained. Often, as a result, the composition and/or mechanical properties of the sample at the beginning of the force volume measurement can be very different from the composition and properties present near the end of the force volume measurement. Also, due to the hysteresis and creep present in the movement of the piezoelectric scanners, over the length of time and the number of force curve measurements for the force volume measurement, the motion of the tip along the Z axis in response to the actuation of the Z section is highly variable. As a result, because the motion of the tip for each of the force curve measurements may not be the same, and most likely is not the same, the data obtained from the force curve measurements will not be accurate concerning the property measurements for the sample.

Overall, the field of SPMs utilized in making force curve and force volume measurements was in need of a scanner having an actuator for the probe and tip capable of enabling force curve measurements to be obtained at a much faster rate. Moreover, the actuator should also be capable of obtaining force curve measurement data in this faster process that is highly accurate quantitative data. Further, while performing this faster and more accurate force curve measurement, the scanner should also enable the probe to be actuated by the scanner in a conventional scanning mode, such as tapping, contact, torsional resonance, or shear force modes to obtain imaging data on the sample without detrimentally affecting the accuracy of the data obtained or the speed of performing the force curve measurements.

SUMMARY OF THE INVENTION

The preferred embodiment overcomes the drawbacks of prior art systems by providing a force scanning probe microscope (FSPM) that includes a second actuator directly on the probe that operates in a virtually linear fashion. More particularly, the second actuator is made of a zinc oxide (ZnO) layer applied to the probe including the cantilever thereof. The properties of the ZnO layer allow for the probe tip to be moved in a highly linear fashion with a minimum of hysteresis and creep, and also provide an operational frequency range that allows the actuator to be operated at a speed approximately fifty times faster than conventional piezoelectric actuators.

The second actuator is connected directly to the FSPM controller such that the operation of the second actuator can be closely controlled in conjunction with the operation of the first, or conventional piezoelectric actuator. Thus, in performing force curve measurements for a force volume analysis of a sample, for each force curve measurement the controller can utilize the piezoelectric actuator to initially position the tip at the appropriate location or pixel on the sample, and at the appropriate distance from the sample utilizing a conventional feedback loop. Once the piezoelectric actuator has properly located the tip with respect to the sample, the controller can switch the feedback loop off and utilize the ZnO actuator to perform the force curve measurement by moving the tip towards, into contact with and away from the sample. Because the feedback loop is off, and due to the much wider range of operational bandwidth at which the ZnO layer actuator can be operated, the time necessary for performing each force curve measurement is greatly reduced, thereby significantly lowering the overall amount of time necessary to perform a force volume analysis. Further, because the movement caused by the ZnO layer actuator in response to the voltage supplied to the zinc oxide layer actuator by the controller is virtually linear, the data obtained by the tip during the force curve measurement is highly accurate.

According to a first aspect of the preferred embodiment, a probe instrument having a probe that interacts with a sample having a surface includes a piezoelectric scanner producing relative motion between the sample and the probe. In addition, a probe actuator produces relative motion between the sample and the probe, in a generally vertical direction, and a controller that generates a scanner drive signal and an actuator drive signal. The probe actuator is responsive to the actuator drive signal having an operable bandwidth of at least about 5 kHz, and may be greater than 50 kHz.

According to another aspect of this preferred embodiment, the probe includes a base, a cantilever extending outwardly from the base, and a tip disposed on the cantilever opposite the base. The probe actuator is located either at least partially on the cantilever, or, on the base and the cantilever.

In another aspect of this embodiment, the probe actuator is formed of a layer of a metallic substance having a substantially linear deflection response to the actuator drive signal and the metallic substance has an operational mechanical bandwidth range of between about 50 kilohertz and 80 kilohertz. The metallic substance can be either a metal oxide or zinc oxide.

According to a still further aspect of this preferred embodiment, the scanner is controlled by a feedback loop operating generally continuously, and the relative motion produced by the probe actuator is used to measure a property associated with at least one pixel of the sample surface. Notably, the feedback loop is interrupted when measuring the property.

According to another aspect of this preferred embodiment, a detector to sense a deflection of the probe when measuring the property outputs data used to generate a force curve. The property may be an elasticity of the sample, and the slope of the force curve is indicative of the elasticity.

According to a still further aspect of this preferred embodiment, a corresponding force curve is generated at a plurality of pixels, and the corresponding force curves are compiled to generate a force volume image generated in less than one hour (and in some cases less than 5 seconds for a 100×100 pixel sample.

In yet another aspect of this preferred embodiment, a detector to sense a current between a tip of the probe and the sample may be employed. In this case, the property that may be measured is the conductivity of the sample.

According to an alternate aspect of the preferred embodiment, a method for performing a property measurement on a sample using a probe microscope includes providing a probe microscope having a probe that interacts with a sample. The microscope also includes a piezoelectric scanner that produces relative motion between the sample and the probe in three substantially orthogonal directions, a probe actuator producing relative motion between the sample and the probe in a generally vertical direction, and a controller that generates a scanner drive signal and an actuator drive signal. The method operates a feedback loop with the controller so as to position the probe with respect to the sample using the scanner, interrupts the feedback loop, and then, performs the property measurement using the probe actuator.

According to a still further aspect of this preferred embodiment, a step of positioning the probe at another location with respect to the sample using the scanner prior to interrupting the feedback loop is performed. In this case, the scanner is operated to position the probe with respect to the sample in either tapping mode, contact mode, torsional resonance mode, or shear force mode.

In yet another aspect of this preferred embodiment, the performing step consists of actuating the probe actuator to move the probe to a force measurement position and reading and storing deflection data obtained from the probe at the force measurement position.

According to another aspect of the invention, the method includes determining if all force measurement positions, which are defined by user-defined input, have been measured after reading and storing the deflection data, and if so, generating a force curve based on the data.

According to another aspect of this preferred embodiment, the method includes the step of switching on the feedback loop after determining if all force measurement positions have been measured and repeating the above steps at a plurality of sample surface locations to generate a force volume image. The repeating step includes moving the probe to a next surface location, with the scanner being actuated during the moving step.

According to a still further aspect of this preferred embodiment, the method includes also moving the probe with the probe actuator to a next force measurement position if all force measurement positions have not been measured.

In yet another alternate aspect of the invention, a force volume measurement of a sample using a probe microscope is obtained using a probe microscope including a probe that interacts with a surface of the sample. A piezoelectric scanner producing relative motion between the sample and the probe in three substantially orthogonal directions is also provided. A probe actuator disposed on the probe produces relative motion between the sample and the probe in a generally vertical direction, and a controller generates a scanner drive signal and an actuator drive signal to operate the apparatus. To obtain the force volume measurement of the sample, the method operates a feedback loop to position the probe at the location on the sample to be measured with the scanner, interrupts the operation of the feedback loop, performs a force curve measurement by operating the probe actuator to move the probe through each force measurement position of the force curve measurement and restores the feedback loop to move the probe, using the scanner, to the next location on the sample to be measured.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 5:
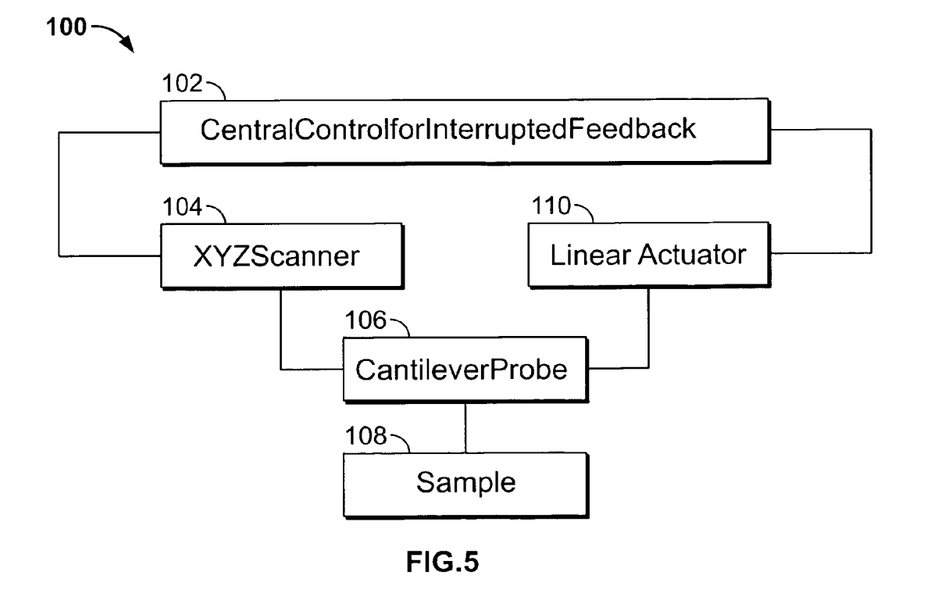
FIG. 5 is a general block diagram of the dual actuator AFM system of the present invention.

With reference now to FIG. 5, a conceptual diagram of a force scanning probe microscope 100 including a dual actuator system of the present invention is illustrated. System 100 includes a central controller 102 that is operably connected to an XYZ scanner 104, such as a piezoelectric or similar scanner, as known in the art. The scanner 104 is in turn connected to a cantilevered probe 106, i.e., probe device, that is capable of being moved, for example, into contact with a sample 108, due to the movement of scanner 104 in the X, Y, and Z axes. Alternately, scanner 104 can be coupled to sample 108 so as to move the sample towards probe 106. This movement may be referred to as vertical movement herein, but it should be understood that probe device 106 is mounted to scanner 104 within the AFM head such that the probe extends about 12 degrees from vertical. Controller 102 is also operably connected to a probe actuator 110, preferably an integrated probe actuator that is also connected to the probe 106 in order to move the probe 106 in a manner different from the movement provided by XYZ scanner 104. As will be described in more detail hereinafter, XYZ scanner 104 is used to properly position the probe 106 with respect to sample 108 prior to performing a force curve measurement on sample 108, while linear actuator 110 is utilized in data acquisition after scanner 104 has positioned probe 106, i.e., to perform a force curve measurement on sample 108.

Figures 6, 6A:
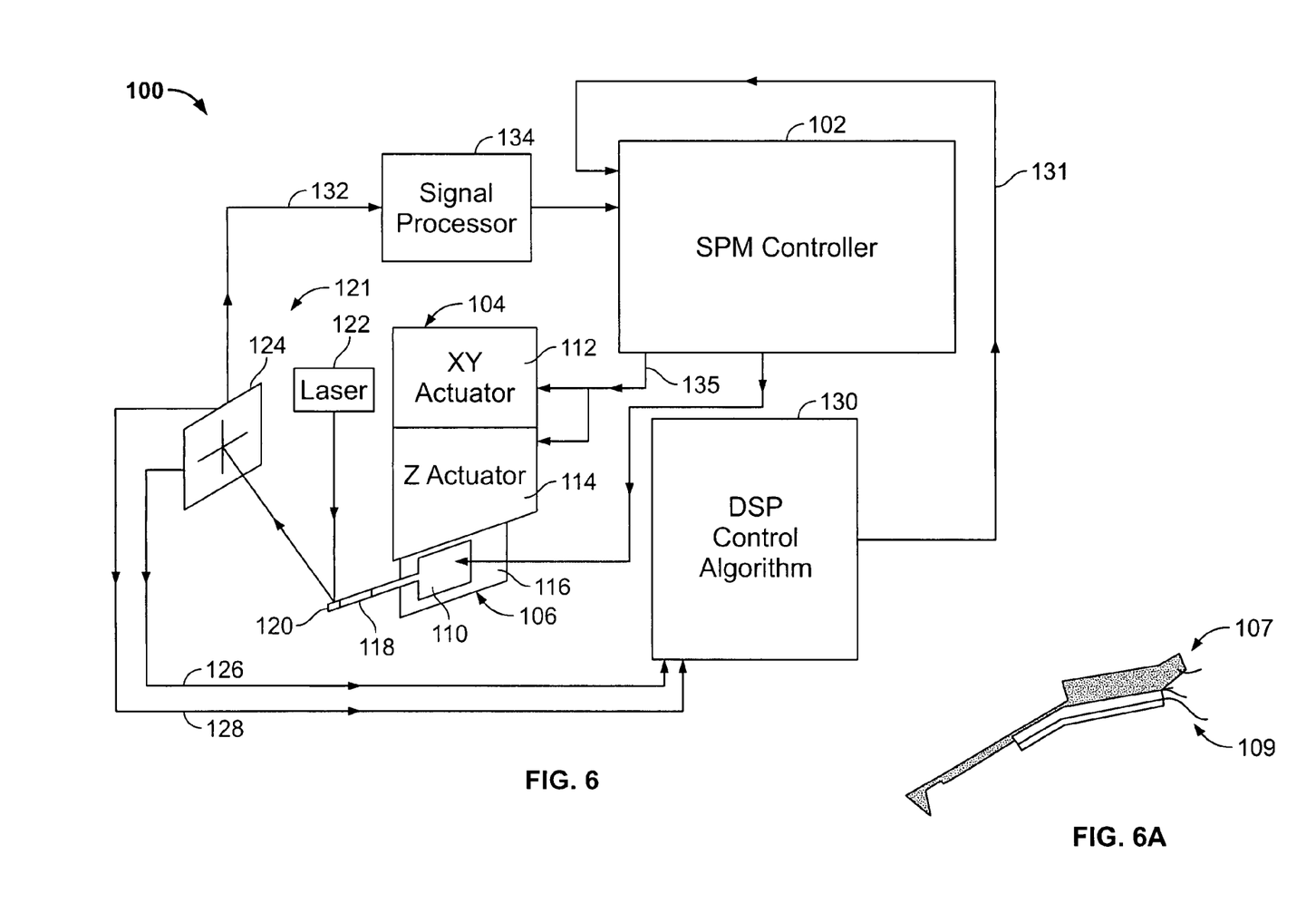
FIG. 6 is a schematic block diagram of a preferred embodiment of the AFM of FIG. 5.
FIG. 6A is a schematic side elevation view of a preferred probe assembly or device.

Turning to FIG. 6, in operating dual actuator SPM 100, XYZ scanner 104 includes an XY actuator 112 and a Z actuator 114, as is typical in the prior art. The actuators 112 and 114 are each operably connected to probe 106 which includes a base 116, a cantilever arm 118 extending outwardly from the base 116, and a tip 120 disposed on arm 118 opposite base 116. In a preferred embodiment, a self-actuated probe 107, having an integrated actuator 109, is employed, as shown in FIG. 6A.

Figure 7:
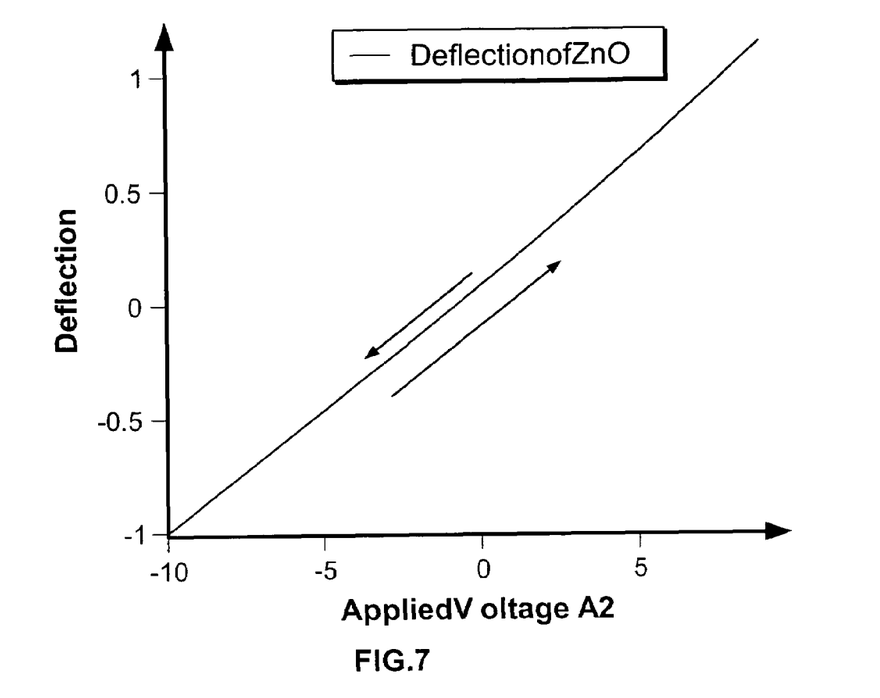
FIG. 7 is a plot of the deflection of the linear actuator of the system of FIG. 5 as the voltage is applied to the actuator.

The probe 106 also includes the actuator 110 which is positioned on base 16 and extends outwardly onto cantilever arm 118. Actuator 110 is formed of a material which is capable of producing movement in the cantilever arm 118, and consequently tip 120, which is virtually linearly responsive to the input voltage supplied to the linear actuator 110, as shown in FIG. 7. Therefore, when a voltage is applied to linear actuator 110, the linear actuator operates to deflect cantilever arm 118 and tip 120 a distance that is linearly proportional to the voltage applied to actuator 110. Notably, to achieve the linear response, the drive signal to actuator 110 may require conditioning to compensate for the non-linear mechanical nature of the actuator.

In a particularly preferred embodiment, actuator 110 is formed from a metal oxide such as a zinc oxide which is preferably deposited as a layer directly on base 116 and cantilever 118 of probe 106 during its microfabrication or batch fabrication process. Moreover, the actuator material may be a bi-layer of materials having substantially different thermal expansivities. As described for the below, the operable bandwidth of actuator 110 is preferably at least about 5 kHz.

The resonance frequency of the probe actuator 110 is at least about 10 kHz, and more preferably, at least 50 kHz, and even more preferably, 100 kHz or more. In addition, the range of motion provided by actuator 110 is preferably at least 10 nm, and more preferably, 100 nm or even 1 µm or more.

SPM 100 also includes a deflection detection apparatus 121 employing a laser 122 that directs a beam towards a reflective back side of cantilever 118 so that the beam is reflected off of cantilever arm 118 adjacent the tip 120 and onto a position sensitive detector 124. The position of the laser beam 122 striking detector 124 is transmitted as both a lateral signal 126 and a vertical signal 128 indicating the position of the tip 120 to controller 102 that utilizes a control algorithm 130. Controller 102 stores a preset set point 131 that is used as a reference to properly position tip 120 with respect to sample 108 prior to the initiation of the force curve measurement. This set point 131 can be any value able to be processed by controller 102 using the signal measured by detector 124 when comparing the set point value with an actual value that is obtained from the transmission of a signal 132 (typically vertical signal 128) from detector 124 to a signal processor 134. The signal processor 134 converts the incoming signal from the detector 124 into a format that is directly comparable with the set point 131 stored in the controller 102. For instance, signal processor 134 can be an RMS-to-DC converter.

These values are compared by controller 102 in order to determine whether tip 120 is properly positioned, typically in Z, with respect to sample 108. If the position of the tip 120 needs to be adjusted based on a difference between the values, the controller 102 will send an adjustment signal 135 to XY actuator 112 and/or Z actuator 114 on the scanner 104 in order to move the probe 106 and tip 120 into the appropriate position prior to initiating any force curve measurement of sample 108. In essence, this portion of the system 100 defines a feedback loop in order to provide the system 100 with the ability to properly position the tip 120 prior to the initiation of any force curve measurement. However, if upon comparing the actual signal with the set point, the controller 102 determines that the tip 120 is properly positioned, the controller 102 will proceed to perform a force curve measurement at the specified location on the sample 108, as described further immediately below.

Figure 10:
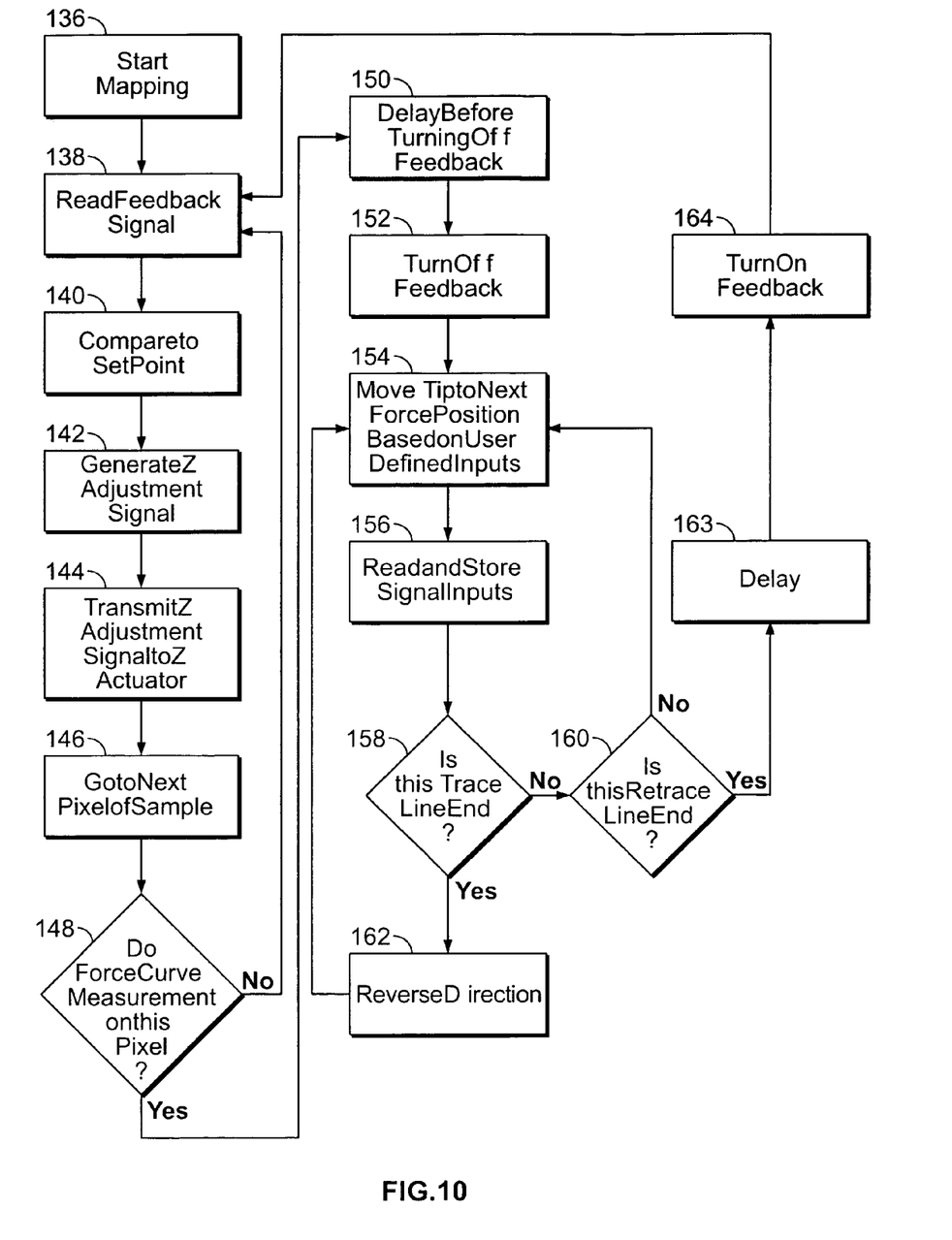
FIG. 10 is a flow chart illustrating the feedback control algorithm utilized in the operation of the system of FIG. 5.

Referring now to FIG. 10, the method of operation for the control algorithm 130 is displayed in detail. The flowchart illustrates the entire procedure for performing a force volume measurement on a sample 108 utilizing the dual actuator AFM 100 including linear actuator 110. From the start, the initiation of a mapping operation of a sample using system 100 is indicated in block 136. Once the system 100 is initiated, the system 100 operates scanner 104 to begin moving probe 106 and/or sample 108 to close tip-sample spacing at a selected location. The scanner 104 can move the probe 106 when in any conventional mode, such as TappingMode™, contact mode, torsional resonance mode or shear force mode, in order to obtain imaging information regarding the sample 108. As the probe 106 is moved, controller 102 also operates the feedback loop described previously, including the laser 122 and position sensitive detector 124, to determine the location of tip 120 with respect to the sample 108 in block 138. In block 140, the measurement obtained by detector 124 is processed by signal processor 134 and compared with the set point associated with the mode of operation in block 140. If upon comparing the actual value and the set point value it is determined that the values are different from one another, the controller 102 uses the difference in the signals and creates an error adjustment signal in the form of a voltage in block 142. The adjustment signal is sent from controller 102 to, preferably, the XYZ scanner 104 in block 144 and upon receiving the signal from the controller 102, the scanner 104 operates the Z actuator 114 in a manner specified by the adjustment signal to reposition the tip 120 at a specified distance from the sample 108 dependent on the set point, the adjustment signal being indicative of a sample characteristic, e.g., topography.

In block 146, after tip 120 has been moved by Z actuator 114, the XY portion 112 of XYZ actuator 104 is operated to move the probe 106 to another pixel of sample 108. Then, in decision block 148, system 100 is queried concerning whether a force curve measurement is to be performed at this particular location or pixel of the sample 108. If no, the system returns to block 138 and obtains a position signal for the tip 120 that is then compared with the set point value. However, if the pixel is to be characterized by performing a force curve measurement, the system 100 answers this question in the affirmative and moves to block 150 which is the beginning of the force curve measurement process for system 100.

In block 150, the system 100 sets a delay prior to switching off the feedback utilized in the previous steps to properly position the tip 120 with respect to the sample 108 using the Z actuator 114. The purpose of this delay is to allow high integrity positioning and preferably is sub-millisecond. Notably, the time for the delay can be controlled by the user inputting the desired time for the delay. Once the delay period has expired, in block 152 the system 100 disconnects the feedback, thereby preventing any movement of, in this case, tip 120 in response to Z actuator 114. In block 154, system 100 then operates to move probe 106 and specifically the cantilever 118 and tip 120 to the next force curve measurement position in order to initiate the force curve measurement based on user defined inputs that define how the force curve measurement is performed; see, for example, U.S. Pat. No. 6,677,697 and U.S. Ser. No. 10/006,090, which are expressly incorporated by reference herein. However, because the XYZ scanner 104, and Z actuator 114, in particular, have been decoupled from the force curve measurement process by switching off the feedback loop, the movement of cantilever 118 and tip 120 in block 154 is completely controlled by the application of a voltage signal to linear actuator 110 disposed on probe 106.

Figure 8A:
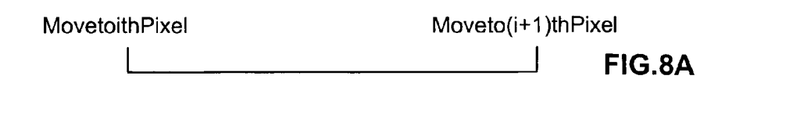
FIGS. 8A-8D illustrate the motion, feedback status, tapping drive and voltage ramp status for the system of FIG. 5 when performing a single force curve measurement.
Figure 8B:
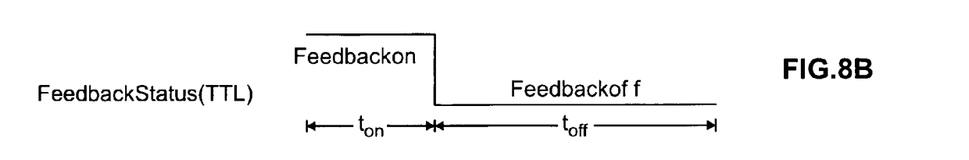
Figure 8C:
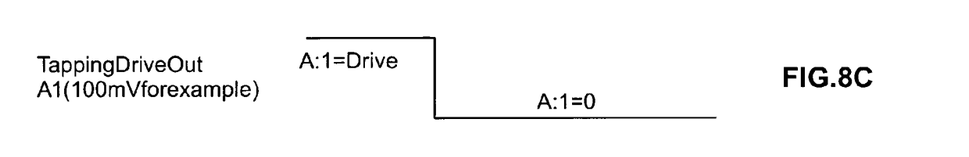
Figure 8D:
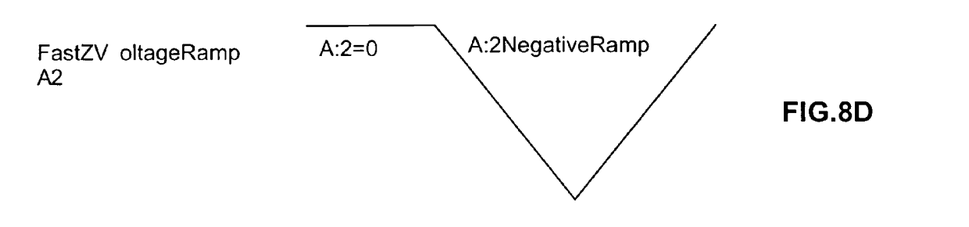

The overall process for each force curve measurement is shown in FIGS. 8A-8D, where FIG. 8A shows the overall elapsed time for each measurement, FIG. 8B shows the feedback status during the measurement process, FIG. 8C shows the operation of the Z actuator 114 during the measurement process, and FIG. 8D shows the operation of the linear actuator 110 during the measurement process. The instant at which the feedback loop is switched off in block 154 is indicated in each of FIGS. 8B-8D and corresponds to the point in time of the operation of the system 100 at which the imaging function of the system 100 ceases and the force curve acquisition function begins. For instance, as shown in FIGS. 8C and 8D, the drive signal "1" can drive probe 106 into oscillation in TappingMode™, to image, for example, topography, using in this case an oscillating signal having an amplitude equal to about 100 mv peak-to-peak, while the user defined input "2" is null. When feedback associated with the mode of operation is switched off, "1" is null, and "2" is used to drive the force measurement using linear actuator 110. In this case, "2" is a negative voltage ramp often used in making force measurements.

Figure 11A:
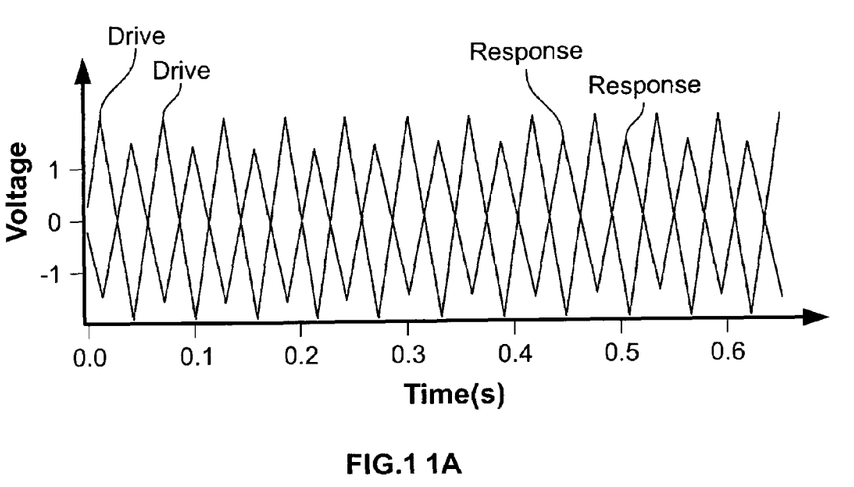
FIGS. 11A and 11B illustrate arc plots of the force curve measurement data obtained from numerous force curve measurements where the system of FIG. 5 is operated at 30 hertz and 3 kilohertz, respectively.
Figure 11B:
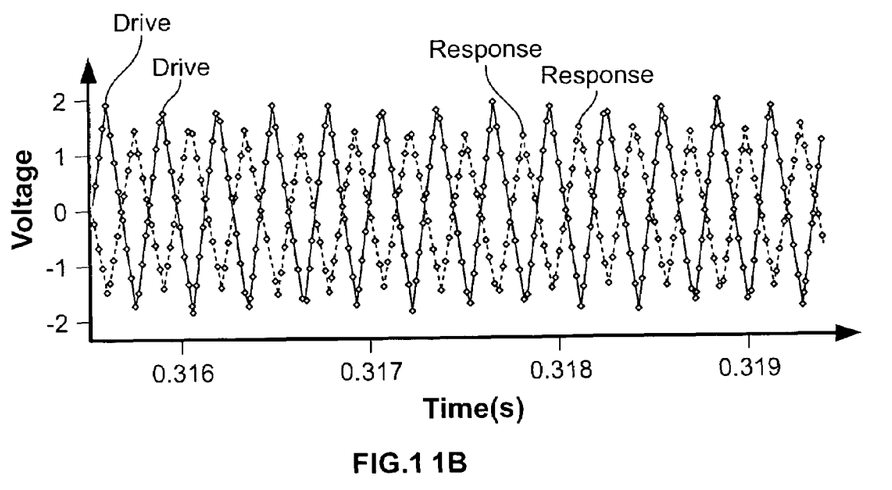

After linear actuator 110 has moved tip 120 to the initial force curve measurement position, in block 156, the system 100 reads and stores the deflection signal, as indicated by the reflection of the laser 122 off of the tip 120 onto the position sensitive detector 124. The signal inputs, i.e., the position and deflection data from the probe 106, are highly accurate based on the ability of controller 102 to closely control the movement of probe 106 using second actuator 110. More specifically, because the actuator 110 causes movement of tip 120 in Z in a virtually linear fashion in response to a voltage signal over a wide range of signal frequencies, as shown in FIGS. 7 and 11A-11B, controller 102, by sending a particular voltage signal to actuator 110, knows very precisely where probe 106 is located with respect to sample 108. With particular reference to FIGS. 11A and 1B, it is notable that probe response is constant as frequency changes by two orders of magnitude, 30 Hz (FIG. 11A) and 3 kHz (FIG. 11B). Thus, the signal from probe 106 that is stored by controller 102 is highly accurate regarding the measured property(ies) of sample 108 relating to force.

After recording this data, the system 100 moves to decision block 158 and determines whether this point is the end of a trace line (in Z) for the particular force curve measurement. The trace line is the line, best shown in FIG. 1 by line segments A and B, that probe 106 traverses as it moves downwardly from the initial position downwardly into contact with the sample 108. As the force curve measurement has just been initiated, the probe 106 has only begun moving along the trace line and the system 100 answers the query in the negative and moves to decision block 160. In this block 160, the system 100 is queried whether the probe 106 has reached the retrace line end. The retrace line is the path traversed by the probe 106 as it moves away from the sample 108, best shown by line segments C, D and E in FIG. 1. Again, because the force curve measurement has just been started, the system 100 also answers this question in the negative and is directed back to block 154. Thus, the system 100 continues through this loop using the algorithm 130 to move probe 106 along the trace line through each of the preset force positions by the actuation of the actuator 110 until probe 106 contacts sample 108 and is deflected to the preset maximum value stored in controller 102. The number of force measurement positions present along both the trace line and retrace line can be set by user inputs to obtain more or less data for each force curve measurement performed. Also, the end point for the trace line, i.e., the reference maximum deflection value set as the end point, can also be specified by a user input value to modify the data obtained by each force curve measurement as necessary.

Once probe 106 has contacted sample 108 and reached the end point on the trace line where the deflection signal from the probe 106 is at the reference maximum value specified for the force curve measurement, the system 100 indicates that probe 106 has reached the end of the trace line in block 158 and moves to block 162 to reverse the direction of movement of the probe 106. As a result, the system 100 moves back to block 154 and operates the controller 102 to move probe 106 so as to disengage probe 106 from sample 108 along the retrace line, while recording the deflection data from the probe 106 at each force position. The controller 102 follows this path in the algorithm 130 and moves probe 106 through each of the predetermined force positions along the retrace line similar to what was done along the trace line until probe 106 reaches the end of the retrace line. Once probe 106 is moved to the end of the retrace line, the force curve measurement for that pixel on sample 108 is completed. The system 100 then moves from decision block 160 to block 164 and recouples the feedback loop with scanner 104, including Z actuator 114, to enable scanner 104 to move tip 120 to the next pixel of sample 108 to be measured, and appropriately position the same in Z. In preparation for moving probe 106, system 100 also initiates block 166 to delay the operation of the system before running the feedback, preferably sub-millisecond.

Figure 9A:
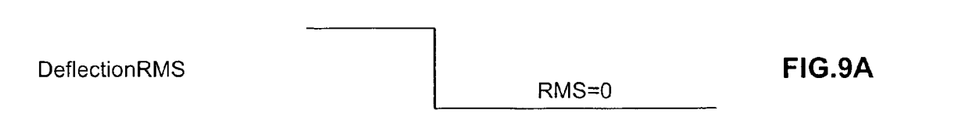
FIGS. 9A-9C illustrate the detection signals received by the system of FIG. 5 in response to the force curve measurement.
Figure 9B:
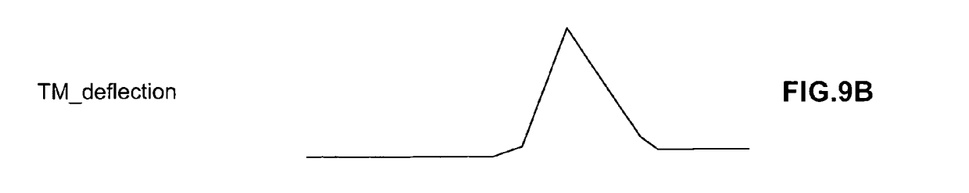
Figure 9C:
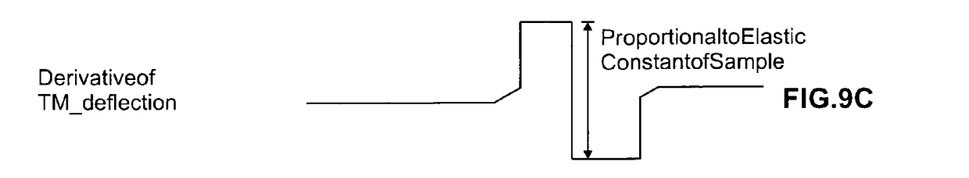

The system 100 continues to operate in this manner until each of the preselected number and spacing of pixels of sample 108 has been measured, and each of the corresponding force curve measurement positions for each pixel have been recorded in order to obtain sufficient data for a force volume measurement of sample 108. FIG. 9A illustrates deflection going to zero once feedback is turned off, i.e., drive signal "1" is switched off. The deflection data obtained from probe 106 for each pixel throughout the force curve measurement and stored by the controller 102 is illustrated in FIG. 9B. By analyzing the slope of the deflection curve obtained in FIG. 9B and using the slope or derivative of this deflection curve, a derivative curve shown in FIG. 9C can be arrived at illustrating the overall difference between the positive and negative slopes for each portion of the deflection curve 9B. This overall distance is proportional to the elastic constant of the material forming the sample 108 and can be utilized by the system 100 along with the data obtained from each of the other points of the sample 108 that are measured to calculate a contact stiffness which is a reflection of various mechanical properties of sample 108, including elasticity and plasticity.

Notably, the interaction between the probe (namely, the tip) and the sample can be measured by monitoring cantilever deflection, as described above, and/or by monitoring a depth of indentation of the probe tip into the sample 108. In this latter case, a sample property can be derived from the force as a function of indentation depth, the force being applied by the tip in response to actuation by the integrated high speed actuator 110.

Due to the use of linear actuator 110 alone during the force curve measurement portion of the measurement process, both the speed and accuracy of the measurement is enhanced greatly. More specifically, in the preferred embodiment, the ZnO used to form the linear actuator 110 enables tip 120 to be moved in a highly controllable and precise fashion due to the linear response of zinc oxide actuator 110 to the input voltage supplied to the actuator. As discussed earlier and shown in FIG. 7, when a voltage signal is directed to the actuator 110 from the controller 102, the deflection of the actuator 110 exhibits a virtually linear response with a less than 1% hysteresis factor, greatly reducing the hysteresis problems known to be present with piezoelectric actuators. Also, the deflection of the actuator 110 is highly reproducible, thereby eliminating the creep problems experienced by standard piezoelectric actuators. In sum, the problems with regard to hysteresis and creep known to occur in piezoelectric actuators do not occur with the linear actuator 110 such that the measurement data obtained by the actuator 110 due to the movement of the tip 120 by the actuator 110 is much more accurate and reliable than was obtainable in prior art FSPMs.

Furthermore, the zinc oxide actuator 110 also has an operational mechanical bandwidth range between 5 kHz and 80 kHz, and preferably at least 50 kHz, which is fifty (50) times larger than the bandwidth range employed for the piezoelectric Z actuator 114. As a result, the speed of obtaining the force curve measurements when using the actuator 110 is approximately fifty (50) times faster than the speed capable by the piezoelectric Z actuator 114. Therefore, by utilizing linear actuator 110 to drive cantilever 118, it is possible to increase the accuracy of the data obtained in a force curve measurement as well as the speed of movement of the data-acquiring actuator in a process that increases the, for example, elasticity mapping speed of the force value measurement between 10 to 100 times that of a process utilizing a piezoelectric Z actuator. In addition, because the feedback process is still employed with the piezoelectric Z actuator 114 in between force curve measurements, it is possible to obtain imaging data regarding the topographical features of the sample 108 by operating the Z actuator 114 in any sampling mode, such as TappingMode™, contact, torsional resonance and shear force modes during these periods.

Figure 12:
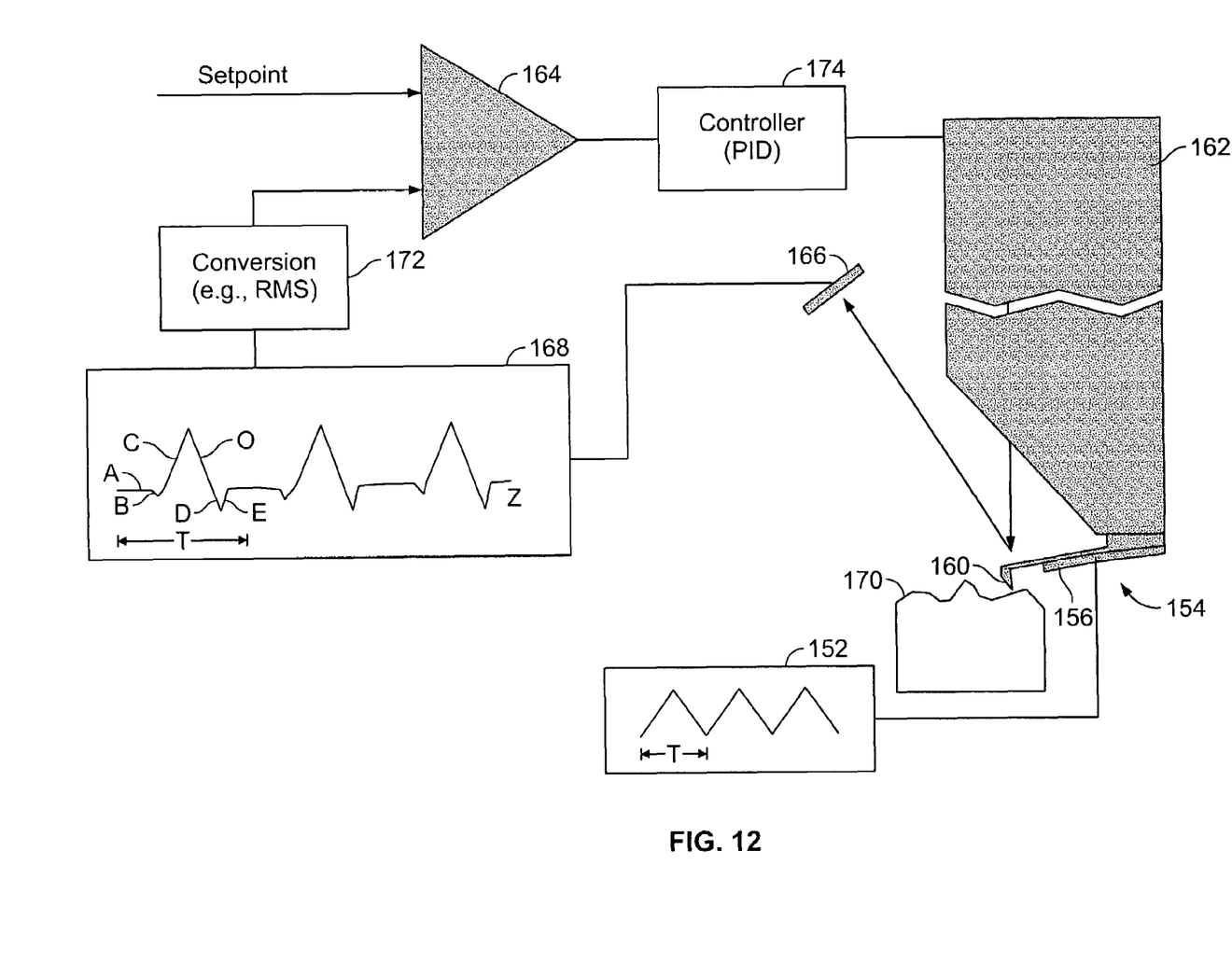
FIG. 12 is a schematic diagram of an AFM according to a preferred embodiment, illustrating a drive for the integrated actuator and the corresponding output.

FIG. 12 is a schematic diagram of an AFM 150 according to a preferred embodiment, illustrating a drive source 152 that generates and transmits a drive signal to an integrated probe actuator 156 of a probe device 154 defining a cantilever 158 and a tip 160. Probe device 154 is coupled to a piezoelectric actuator or Z drive/scanner 162 (e.g., a tube) that actuates the probe 154 in at least the vertical or Z-direction as part of a feedback control loop that maintains operation of the AFM at a setpoint that is input to a comparator 164. To conduct a force spectroscopy measurement, drive 152 transmits a signal to actuator 156 to produce a force curve essentially as that shown in FIG. 2. The drive signal output by source 152 is a linear drive, preferably, that has a period T. This causes linear motion of probe device 154 which is sensed by a detector 166. Detector 166 generates an output signal such as that shown schematically in box 168. That output signal provides an indication of several mechanical properties of a sample 170, as discussed further below. Notably, in operation, it is the output signal from detector 166 that is also sent to, for example, an RMS-to-DC converter 172 for input to comparator 164. Comparator 164 determines if the setpoint is maintained and transmits a signal to a controller 174 (e.g., a PID controller) to provide feedback gain accordingly and transmit a corresponding control signal to Z drive 162.

The output shown in box 168, a graph of force or cantilever deflection versus time, provides the user with data indicative of sample properties as follows, as noted previously. Again, the tip 160 of probe 154 is brought towards sample in the region between "A" and "B". As tip 160 approaches the surface of sample 170 the tip typically will snap to contact at about "B" and thereafter, in response to the linear drive signal applied to actuator 156 it is pushed toward sample 170 in region "C" during the loading portion of the measurement (i.e., sample indenting). At region "O", the tip 160 is withdrawn from the sample surface, illustrating the unloading response. At region "D", the tip is shown sticking to the surface prior to letting loose from the sample surface at region "E." In this case, the slope of region "C" provides as indication of the elasticity of sample 170.

Figure 13:
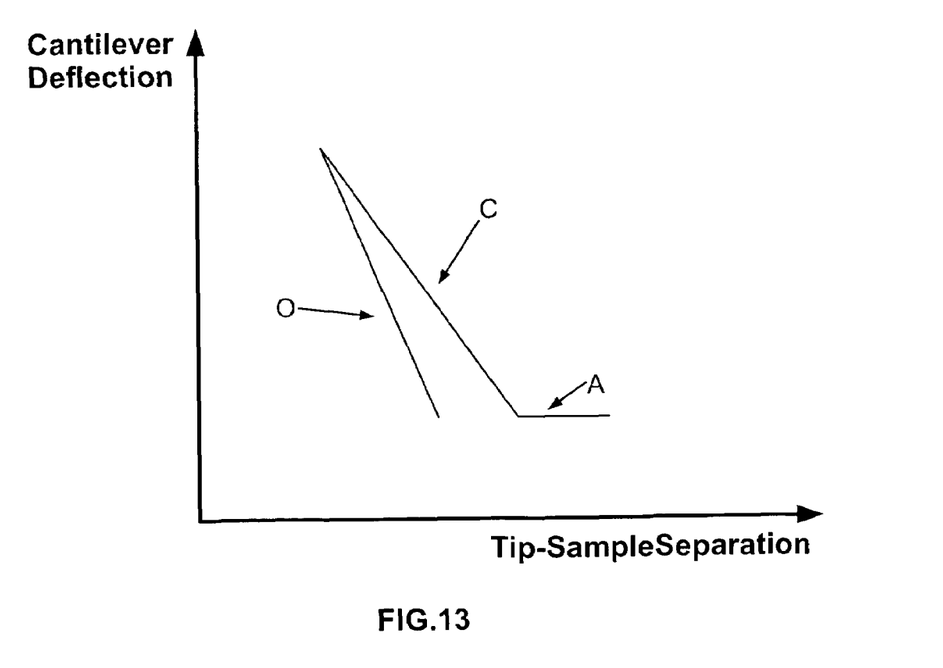
FIG. 13 is a graph illustrating a response of the actuator.

Moreover, plasticity is given by the difference in slope between regions "C" and "O". This is further illustrated in FIG. 13, a graph showing a deflection response of probe 154 to linear probe actuation, which causes the probe to interact with the sample. Region "A" in FIG. 13 illustrates the probe above the sample. Region "C" is the probe response as tip 160 is driven toward the sample, and region "O" is the response as the tip is withdrawn. Notably, unlike the case shown in FIG. 2, the illustration in FIG. 13 is more typical showing plastic deformation of the sample. In particular, the steeper slope of region "O" of FIG. 13 versus the slope of region "D" of the schematic shown in FIG. 2 is indicative of plastic deformation. Notably, FIG. 13 also illustrates how the response of the probe to the integrated actuator drive can be used to control the feedback loop to insure that the force measurement is conducted on the sample at an appropriate range for the integrated actuator. In this case, either the amplitude of the response to probe/sample interaction (e.g., indentation amplitude—illustrated on a force curve as understood in the art) shown in FIG. 13 or the area under the curve defined by probe response "C" and "O" provides an indication of average position which can be used by the feedback loop to control scanner 162. In this way, scanner 162 can position probe device so that when the force measurement is conducted (for example, during interruption of feedback during AFM operation) the probe 154 is correctly positioned to accommodate the range of integrated actuator 156. In other words, scanner 162, in response to the interaction between the probe and the sample, moves the integrated probe actuator 154 to maintain an average position of the probe to the sample at a setpoint substantially while the probe actuator 156causes indentation of the sample, preferably at a frequency substantially higher than the operable bandwidth of said scanner Turning back to FIG. 12, the dependence of the shape of regions "C" and "O" on frequency (or period T of the drive signal) provides an indication of a mechanical property such as viscoelasticity, as understood in the art. Overall, it is notable that the feedback loop operates scanner 162 at a bandwidth substantially lower than that of the periodic liner drive 152 of the integrated probe actuator 156. This facilitates being able to coordinate both force curve and force volume measurements with a high degree of accuracy and reliability.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

We claim:

1. An instrument including a probe that interacts with a sample having a surface, the instrument including:
   a cantilever supporting an integrated probe actuator producing relative motion between the sample and the probe to load and unload the probe relative to the sample;
   a controller that generates an actuator drive signal;
   a scanner to provide relative motion between the sample and probe in response to the interaction between the probe and the sample; and
   wherein said probe actuator has an operable bandwidth of at least about 5 kHz and wherein a probe response to actuation of the probe actuator is indicative of a mechanical property of the sample.

2. The instrument of claim 1, wherein the probe includes a base, said cantilever extending outwardly from said base, and a tip disposed on said cantilever generally opposite said base, wherein said probe actuator is located at least partially on said cantilever.

3. The instrument of claim 1, wherein said probe actuator has a resonance frequency of at least about 10 kHz and has a range of at least about 10 nm.

4. The instrument of claim 3, wherein said probe actuator has a resonance frequency of at least about 100 kHz.

5. The instrument of claim 4, wherein the range is at least about 1 μm.

6. The instrument of claim 1, wherein said probe actuator provides a substantially linear response.

7. The instrument of claim 1, wherein said probe actuator is formed of at least a layer of a material having a substantially linear deflection response to the actuator drive signal.

8. The instrument of claim 7, wherein said material is a metal oxide and has an operational mechanical bandwidth higher than about 5 kHz.

9. The instrument of claim 8, wherein said metal oxide is zinc oxide.

10. The instrument of claim 7, wherein said material is a bi-layer consisting of materials having substantially different thermal expansivities.

11. The instrument of claim 1, wherein the interaction is measured by at least one of cantilever deflection and a depth of indentation of the probe tip into the sample.

12. The instrument of claim 11, wherein a sample property is derived from a force applied by the tip as a function of the indentation depth, the applied force being in response to actuation of the high speed actuator.

13. The instrument of claim 1, wherein said scanner provides motion in three substantially orthogonal directions.

14. The instrument of the claim 1, wherein said scanner, in response to the interaction between the probe and the sample, moves the integrated probe actuator to substantially maintain an average position of the probe to the sample at a setpoint while the probe actuator causes indentation of the sample at a frequency substantially higher than the operable bandwidth of said scanner.

15. The instrument of claim 14, wherein said scanner substantially maintains a constant deflection amplitude in response to interaction between the probe and the sample while the integrated actuator controls an indentation amplitude.

16. The instrument of claim 1, wherein said scanner is controlled by a feedback loop operating generally continuously, and wherein the relative motion produced by said probe actuator and the interaction force as a result of the actuator motion are used to measure a property associated with at least one pixel of the sample surface, and wherein said feedback loop is interrupted when measuring the property in response to indenting to the sample.

17. The instrument of claim 16, further including a detector to sense a deflection of the probe when measuring the property, wherein an output of said detector is used to generate a force curve, wherein the force curve is the applied force as a function of at least one of actuator displacement and probe tip indentation of the sample.

18. The instrument of claim 17, wherein the property is an elasticity of the sample, and a slope of the force curve is indicative of at least one of the elasticity and plasticity.

19. The instrument of claim 1, wherein a corresponding force curve is generated at a plurality of pixels at different locations of the sample, and the corresponding force curves are used to generate a force volume image.

20. The instrument of claim 19, wherein the force volume image is generated in less than one hour for a 100×100 pixel sample.

21. The instrument of claim 20, wherein the force volume image is generated in less than one minute for a 100×100 pixel sample.

22. The instrument of claim 21, wherein the force volume image is generated in less than five seconds for a 100×100 pixel sample.

23. A method for performing a property measurement on a sample using a probe microscope, the method including the steps of:
   providing a probe microscope including a probe that interacts with a sample having a surface, a scanner producing relative motion between the sample and the probe, wherein the probe includes a cantilever supporting an integrated probe actuator producing relative motion between the sample and the probe to apply a load on the sample, and a controller that generates a scanner drive signal and an actuator drive signal;
   operating a feedback loop with the controller so as to position the probe with respect to the sample using the scanner; and performing the property measurement by actuating the integrated actuator with an actuator drive signal, wherein the bandwidth of the performing step is at least about 5 kHz.

24. The method of claim 23, further comprising interrupting the feedback loop to conduct the performing step.

25. The method of claim 24, further comprising the step of positioning the probe at another location with respect to the sample using the scanner prior to interrupting the feedback loop.

26. The method of claim 24, further comprising the step of waiting a user-defined time delay prior to interrupting the feedback loop.

27. The method of claim 24, wherein the bandwidth associated with said performing step is at least about 5 kHz.

28. The method of claim 27, wherein the bandwidth associated with said performing step is at least about 50 kHz.

29. The method of claim 28, wherein said performing step includes modifying the actuator drive signal to facilitate producing a substantially linear response from the probe actuator.

30. The method of claim 23, wherein said performing step comprises:
actuating the probe actuator to move the probe to a force measurement position; and
reading and storing deflection data obtained from the probe at the force measurement position.

31. The method of claim 30, further comprising the step of switching on the feedback loop after determining if all force measurement positions have been measured.

32. The method of claim 31, further comprising the step of repeating said above steps at a plurality of sample surface locations, and generating a force volume image based on said repeating step.

33. The method of claim 23, wherein said operating step is performed using an output of said performing step.

34. The method of claim 33, wherein said performing step includes actuating the probe actuator to load and unload the probe relative to the sample to produce a probe response and said operating step includes using the output, wherein the output is indicative of at least one of the amplitude of the probe response and an area defined by the probe response.

35. A method of obtaining a force volume image of a sample using a probe microscope, the method including the steps of:
providing a probe microscope including a probe that interacts with a surface of the sample, a piezoelectric scanner producing relative motion between the sample and the probe in three substantially orthogonal directions, an integrated probe actuator supported by a cantilever of the probe producing relative motion between the sample and the probe in a generally vertical direction, and a controller that generates a scanner drive signal and an actuator drive signal;
operating a feedback loop to position the probe at the location on the sample to be measured with the scanner;
interrupting the operation of the feedback loop;
performing a force curve measurement by operating the probe actuator to move the probe through each force measurement position of the force curve measurement;
restoring the feedback loop to move the probe using the scanner to the next location on the sample, and
wherein the performing step is performed in less than 500 μsec.

36. The method of claim 35, further comprising,
repeating the above steps; and
generating a force volume image based on said repeating step, wherein the image is indicative of at least one of elasticity, hardness, viscoelasticity, and energy dissipation.

* * * * *